J. STOTT.
MACHINE FOR ORNAMENTING GLASS.
APPLICATION FILED JAN. 19, 1915.

1,158,329.

Patented Oct. 26, 1915.
2 SHEETS—SHEET 1.

J. STOTT.
MACHINE FOR ORNAMENTING GLASS.
APPLICATION FILED JAN. 19, 1915.

1,158,329.

Patented Oct. 26, 1915.
2 SHEETS—SHEET 2.

WITNESSES
Daniel Webster, Jr.
E. W. Smith

INVENTOR
James Stott
BY
ATTORNEY

UNITED STATES PATENT OFFICE.

JAMES STOTT, OF PHILADELPHIA, PENNSYLVANIA.

MACHINE FOR ORNAMENTING GLASS.

1,158,329.   Specification of Letters Patent.   Patented Oct. 26, 1915.

Application filed January 19, 1915. Serial No. 3,116.

*To all whom it may concern:*

Be it known that I, JAMES STOTT, a citizen of the United States, and resident of Philadelphia, county of Philadelphia, and State of Pennsylvania, have invented an Improvement in Machines for Ornamenting Glass, of which the following is a specification.

The object of my invention is to provide mechanical means for conveniently holding and controlling a glass article upon which ornamentation is to be ground or cut, and also for controlling the cutting means whereby accuracy is secured in the design being cut.

More particularly, my object is to provide ornamentation on cut glass articles in the form of grooves having V-shaped cross section, and to cross such cuts in a manner to produce prismatic effects, and to accomplish these results with great accuracy and in a rapid manner.

By my improved apparatus I am enabled to control the glass article as well as the cutting tools, so that great accuracy and uniformity in the cutting may be secured; and moreover, the operation of the cutting tool may be brought into various relations with the article to be cut so as to cross or otherwise associate the successive cuts to produce the most artistic effects. Furthermore, by employing a plurality of cutting devices about the article to be cut the time consumed may be reduced to one eighth or less of the time which would be required where a single tool was employed or where the cutting was done by hand operation.

My object is also to provide a machine in which the parts are so assembled and coöperatively arranged that a large number of machines may be operated under the control of a single attendant, each machine cutting the same design upon a separate piece of glassware, all of which tends to greatly cheapen the cost of production as well as improving the accuracy and appearance of the finished article.

With the above and other objects in view, the nature of which will more fully appear hereinafter, the invention consists in the novel construction, combination and arrangements of parts as hereinafter more fully described, and more particularly defined in the claims.

Figure 1:
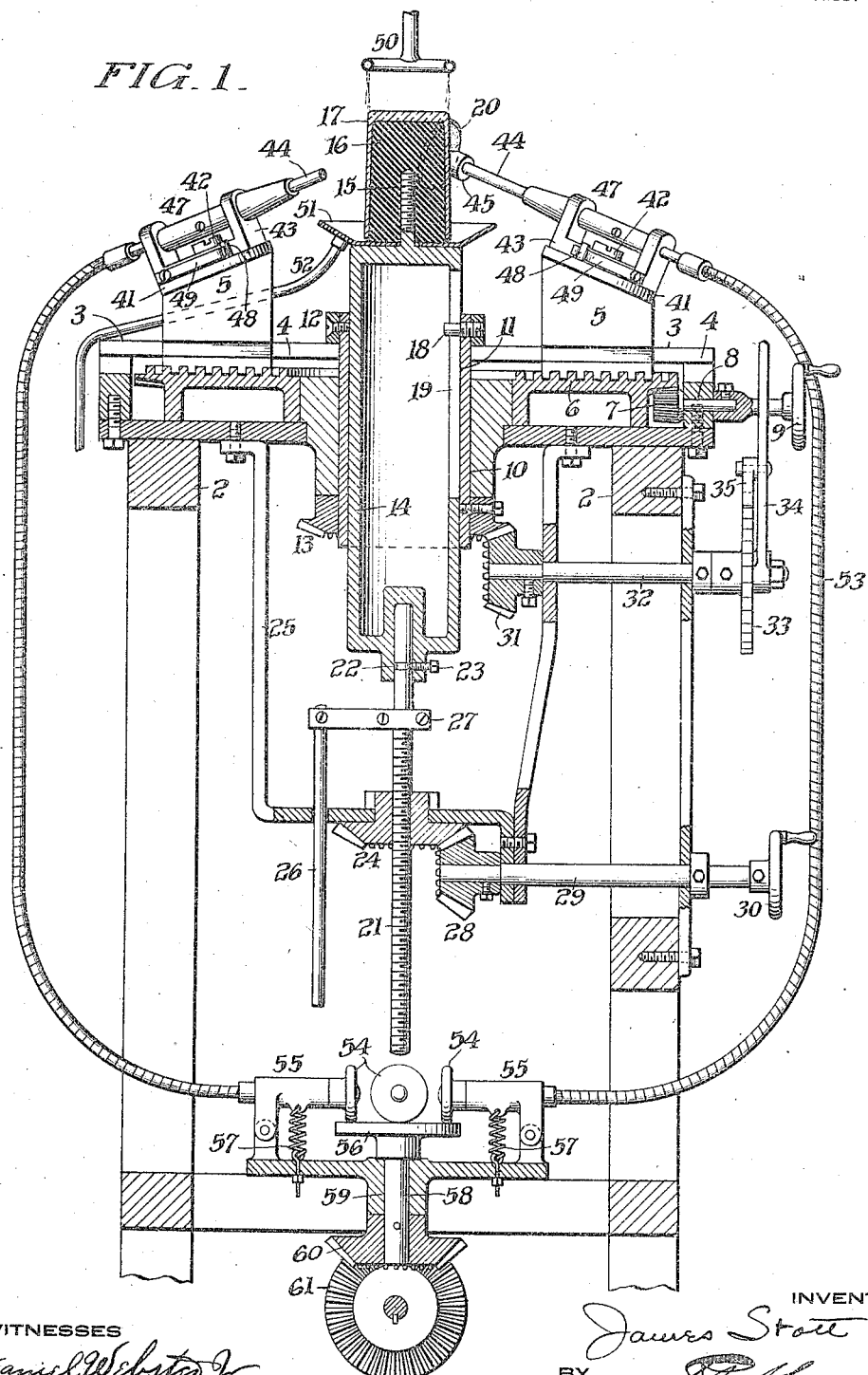
Figure 2:
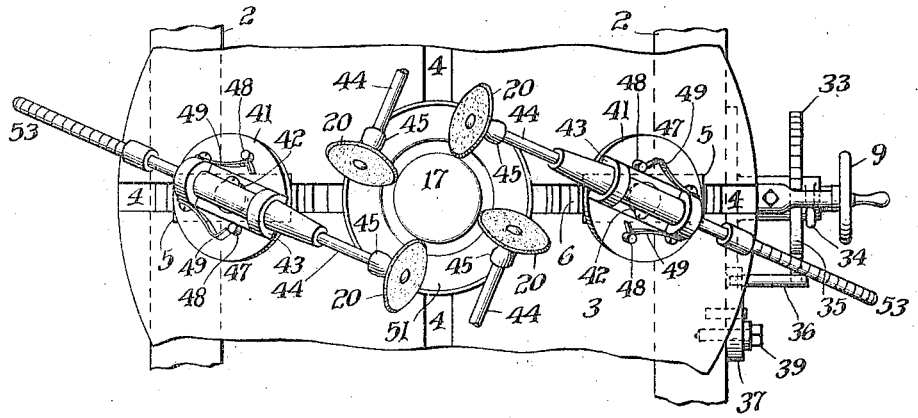
Figure 3:
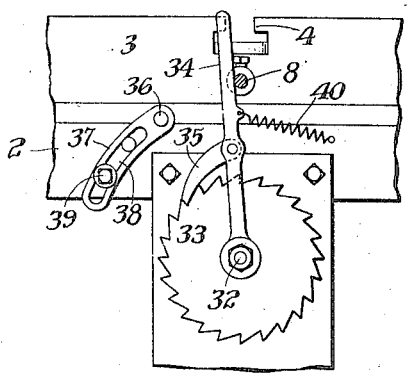
Figure 4:
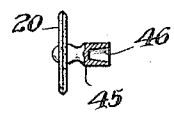
Figure 5:
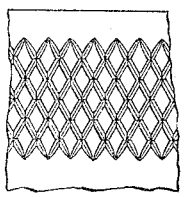
Figure 6:
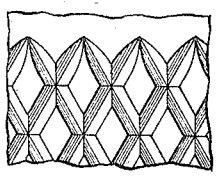
Figure 7:
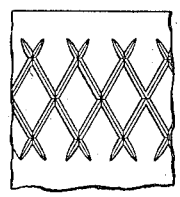

Referring to the drawings: Figure 1 is a sectional elevation through a glass cutting machine embodying my improvements; Fig. 2 is a plan view of the same with a portion broken away; Fig. 3 is an elevation of a portion of the same; Fig. 4 is an elevation of one of the grinding wheels showing its connection on the spindle and with part in section; and Figs. 5, 6 and 7 are elevations illustrating some of the forms of cutting which may be accomplished by the use of my improved machine.

2 is a suitable framework or table upon which is supported a head 3 having radial guide grooves 4 in which a plurality of sliding blocks 5 are adjustably guided, said blocks being furnished with teeth which engage spiral teeth in a rotary disk 6 contained within the head and rotated by means of gearing 7 and a shaft 8, which latter may be rotated by a hand wheel 9.

The construction just described may be similar in general organization to what is found in lathe chucks, but instead of there being the usual three jaws I prefer to provide four or more radially sliding blocks 5. In the particular illustration I have indicated four, but there may be six, eight or more of these blocks according to the size of the machine and character of the work to be accomplished. The head 3 is supported in a stationary manner upon the table and at its central portion is provided with a vertical guideway 10 in which a sleeve 11 is journaled and adapted for rotation. The upper end of the sleeve is provided with a collar 12 and the lower end of the sleeve is secured to a bevel gear 13. In this manner the sleeve is held against vertical movement but is free to rotate. Sliding vertically in the sleeve is a cylindrical plunger 14 having at its upper part a stud 15 on which a rubber work-holder 16 may be placed and held, said holder 16 acting to support a tumbler 17 or other article of glassware which is to be inverted and held in position during the cutting operation. The plunger 14 is of greater length than the sleeve 11 and is adapted to slide vertically therein but is held against independent rotation by means of a pin 18 on the sleeve extending into a vertical slot 19 on the plunger. In this manner the rotation of the sleeve 11 will also rotate the plunger but will not interfere with the vertical reciprocations of the plunger which may be employed to bring the glass article to different positions of elevation to insure cutting by the rotary grinding wheels 20 at different longitudinal portions of the article.

Secured to the lower part of the plunger 14 is a screw threaded shaft 21, said shaft having an annular groove 22 in which a set screw 23 extends for holding the screw threaded shaft against longitudinal movement in respect to the plunger, but at the same time permitting the plunger to be rotated about the shaft when necessary. If the plunger 14 is sufficiently heavy to overcome the friction in its association with the sleeve 11 the weight of the plunger may be sufficient to hold it always in contact with the top of the screw threaded shaft 21 and in this way obviate the necessity of the groove 22 and the screw 23, but to insure positive action I prefer to employ the latter. Screwed upon the screw threaded shaft 21 is a bevel gear 24, said bevel gear being journaled in a frame 25 which is bolted to the bottom of the head 3, so that while the bevel gear may rotate it cannot move vertically; the result of this is that the rotation of the bevel gear causes the screw threaded shaft to be raised or lowered and in that manner raises or lowers the plunger 14 and the work holder in respect to the grinding wheels 20. To prevent the screw threaded shaft 21 rotating, it may be provided with a parallel guide rod 26 clamped at 27 to the said shaft, the guide shaft working through an aperture in the frame 25. While I prefer to use this connection between the screw threaded shaft 21 and the plunger 14, whereby the plunger may rotate without rotating the shaft 21 so that the rotary adjustment of the plunger will not raise or lower the work in respect to the position of the grinding wheels, nevertheless if the screw thread of the shaft 21 is of very fine pitch the screw 23 may be set up tight to hold the shaft 21 rigid with the plunger, and in that manner dispense with the additional guide 26. That this dispensing with the guide 26 may be accomplished, without materially interfering with the accuracy of the cutting effects, would be apparent when we keep in mind that there are a plurality of cutters 20 arranged about the glass article to be cut so that the extent of the rotation of the plunger would only approximate the arc between any successive cutters since each cutter repeats the operation of the adjacent cutters. In this manner where there are four cutters or grinding wheels the total rotation of the plunger would approximate one fourth of a revolution. When there are eight cutters or grinding wheels the rotation would only approximate one eighth of the circumference, or corresponding to an arc of forty-five degrees. If the pitch of the screw threaded shaft 21 is fine it is manifest that the turning of the screw thread in the bevel gear 24 through an arc of forty-five degrees would not materially raise or lower the work, and in most cases what variation was accomplished in this manner would not be objectionable. I therefore do not restrict myself to the particular manner in which the screw threaded shaft 21 is connected with the plunger.

The bevel gear 24 may be rotated by a bevel pinion 28 secured to the end of a shaft 29 having a hand wheel 30 by which to rotate it. By rotating the hand wheel 30 the plunger 14 is raised or lowered to bring the particular portion of the tumbler 17, or other article to be cut, at the right relative position in respect to the grinding wheels 20 for any particular ornamentation which it is desired to place upon the glass surface.

The plunger 14 and its carrying sleeve 11 is given rotary adjustment by means of a bevel pinion 31 secured to a shaft 32, said shaft being provided at its outer end with a ratchet wheel 33 and a pivoted lever 34, having a pawl 35 pivoted to it and engaging the ratchet teeth of the wheel 33. By rocking the lever 34 the shaft 32 may be given a step by step adjustment; the throw of the lever 34 may be restricted in one direction by the shaft 8 on the head 3 and the pin 36 which is adjustably clamped to the table in any suitable manner. As shown it is secured to a plate 37 having a slot 38 through which a clamping screw 39 passes for holding the plate and the pin 36 in any particular adjustment to vary the throw of the lever 34. As shown, the lever 34 is drawn backward by a spring 40 so that whenever it is released it comes back to a normal position. The number of ratchet teeth in the wheel 33 determines the rotary adjustment of the sleeve and the plunger, and this wheel 33 may be substituted by other wheels of a similar character but having ratchet teeth of less or greater pitch according to the character of the work to be done. For different pitches of teeth the pin 36 is adjusted so that the throw of the lever 34 will be exactly right for each degree of rotary adjustment required to be given to the work. While I have shown a suitable means for accomplishing this rotary adjustment, I do not restrict myself in any manner to the particular means illustrated as these may be modified in various ways, as will be readily understood. It is desirable, however, that the precision of the rotary adjustment shall be accurately made because in the series of cuttings which are to be accomplished by the plurality of rotary grinding wheels the spacing of the cuts must be uniformly distributed about the circumference.

Considering now the grinding wheels and the means of operation, each of the blocks 5 is provided at the upper part with an inclined table portion 41, the incline being upward from the perimeter of the head toward the work holder. Pivoted at 42 upon each of these inclined tables 41 is a swiveled bearing 43 in which a spindle 44 is journaled. These sheets are inclined upward and carry at their upper ends the grinding wheels 20. The wheels may be attached to the spindles 44 in any suitable manner. As shown, the grinding wheel 20 is secured to a head 45 which has a tapered socket 46 which fits over a tapered end of the spindle 44 (as shown more fully in Fig. 4). In this way the head 45 is held on the spindle by friction and may be readily and easily detached and replaced when desired.

The grinding wheel may have its periphery formed in various manners but that which is most preferred has a V-shaped perimeter so as to provide a cut of V cross section in the glass. The inclined table 41 is provided with two pins 47 and 48 between which the swiveled bearing 43 may be shifted. When it is in contact with the pin 47, as shown in Fig. 2, the grinding wheel 20 is cutting a groove with one obliquity. When, however, the swiveled bearing is shifted so as to be brought into contact with the pin 48, then the grinding wheel will be grinding a groove having the opposite obliquity, and this capacity for adjustment is provided so that after cutting a plurality of grooves of one obliquity a similar set of grooves may be cut with the opposite obliquity over the first mentioned grooves and in that manner provide a primatic effect such as indicated in the several Figs. 5, 6 and 7, or other design such as a herringbone effect. Whenever the swiveled bearing 43 is thrown in contact with the pins 47 or 48, as the case may be, springs 49 on the swiveled bearing may snap over the opposite pin so as to hold the swiveled bearing in its adjusted position. This will enable a quick adjustment to be made to the swiveled bearings whenever desired, but in doing so the hand wheel 9 should be rotated sufficiently to move the blocks 5 sufficiently far from the work holder that the grinding wheels 20 may be swung across the work without injury thereto, after which the said blocks are readjusted to their forward cutting positions.

Above the cutting wheels 20 and above the work a water drip pipe may be arranged so as to slowly drop water upon the cutting tools during the cutting operation, said pipe being indicated at 50. As it is not desirable that the water, with the accumulated paste formed by the grinding, shall find its way down to the mechanism of the apparatus, I prefer to clamp between the work holders 16 and the top of the plunger 14 a cup shaped trough or plate 51 to receive the waste water and cuttings and convey them away by the drain pipe 52. The spindles 44 may be rotated in any suitable manner, but as it is desirable that they shall be readily adjusted by the swiveled head and also by the adjustable block 5 it is desirable that they shall be driven by flexible shafts 53, said shafts terminating at their ends in the friction wheels 54 having spindles journaled in pivoted bearings 55. The several friction wheels 54 are pressed in contact with a rotating disk 56 by means of the springs 57 which pull the spindle bearings 55 downward. The rotating disk 56 is secured to a shaft 58 which is journaled in the frame 59 upon which the spindle bearings 55 are hinged, and said shaft 58 may be rotated by miter gears 60 and a power shaft 61. Any other suitable arrangement for driving the flexible shaft 53 may be employed in lieu of that here shown.

I have described my improved machine as a single machine which may be easily and quickly adjusted by an operator without touching the glass article after it has once been placed in position, but it is manifest that a plurality of similar machines may be conveniently arranged upon the same table 2 and the several hand wheels 9, 30 and ratchet lever 34 may be simultaneously operated on any number of machines, and in this way reduce the number of persons required for turning out any given quantity of work, such assemblage of a plurality of machines forming no part of the present invention.

I have described my invention in a form which I have found excellently adapted for the purposes for which it is intended, but I do not restrict or limit myself to the details herein described and illustrated as the parts may be greatly modified or varied without departing from the essential characteristics of the invention. Broadly considered the invention comprehends means for adjusting the work and the cutting tools relatively to each other in a circumferential direction about the work in an intermittent manner whereby a successive series of cuts may be produced in the circumference of the article being cut, said relative adjustment being accomplished by mechanical means in a definite and accurate manner. The invention also comprehends broadly the capacity in an organized machine of shifting the oblique relation of the cutter in respect to the article being cut so that cuts of opposite obliquity may be readily produced on the article, either in the same elevation or otherwise, with accuracy and rapidity. It will therefore be understood that while mechanism is necessary for producing the relative circumferential rotation of the work in respect to a plurality of cutters, the particular means employed for accomplishing these results may be greatly modified as may also be the mechanism for changing the relative angles of the grinding wheels in respect to the article for changing the obliquity of the cuts when required.

Having now described my invention, what I claim as new and desire to protect by Letters Patent is:—

1. In a machine of the character stated, the combination of a head, a plurality of blocks adjustable in a substantially radial direction upon said head, means for simultaneously adjusting the plurality of blocks radially to and from each other, a central support for an article to be cut, means to impart a rotary adjustment to the support for the article, a plurality of spindles journaled respectively upon the plurality of blocks, means for rotating the spindles, and grinding wheels carried upon the ends of the spindles adjacent to the work supporting means.

2. In a machine of the character stated, the combination of a head, a plurality of blocks adjustable in a substantially radial direction upon said head, means for simultaneously adjusting the plurality of blocks radially to and from each other, a central support for an article to be cut, means to impart a rotary adjustment to the support for the article, a plurality of spindles journaled respectively upon the plurality of blocks and arranged in a direction oblique to the axis of the support for the article both longitudinally and circumferentially, means for rotating the spindles, grinding wheels carried upon the ends of the spindles adjacent to the work supporting means, and means for changing the angle of the spindles upon their respective blocks to change the angle of the cuts made by the wheels upon the article.

3. In a machine of the character stated, the combination of a head, a plurality of blocks adjustable in a substantially radial direction upon said head, means for simultaneously adjusting the plurality of blocks radially to and from each other, a central support for an article to be cut, means to impart a rotary adjustment to the support for the article, a plurality of spindles journaled respectively upon the plurality of blocks, means for rotating the spindles, grinding wheels carried upon the ends of the spindles adjacent to the work supporting means, and means to adjust the central supporting means vertically in respect to the grinding wheels.

4. In a machine of the character stated, the combination of a head, a plurality of blocks adjustable in a substantially radial direction upon said head, means for simultaneously adjusting the plurality of blocks radially to and from each other, a central support for an article to be cut, means to impart a rotary adjustment to the support for the article, a plurality of spindles journaled respectively upon the plurality of blocks, means for rotating the spindles, grinding wheels carried upon the ends of the spindles adjacent to the work supporting means, means for delivering water simultaneously to the plurality of grinding wheels, and a trough below the grinding wheels having a drainage tube leading therefrom for conveying the collected water to a distant place.

5. In a machine of the character described, a head combined with central work supporting means, separate mechanism for adjusting the work supporting means in a vertical direction and also about a vertical axis, a plurality of grinding wheels arranged about the work supporting means, a plurality of spindles for rotating the respective grinding wheels, means for rotating the spindles, and adjusting means for adjusting the spindles and their grinding wheels in a radial direction to or from the work holder.

6. In a machine of the character described, a head combined with central work supporting means, separate mechanism for adjusting the work supporting means in a vertical direction and also about a vertical axis, a plurality of grinding wheels arranged about the work supporting means, the plane of the respective grinding wheels and also their axis of rotation being oblique to the axis of the work supporting means, a plurality of spindles for rotating the respective grinding wheels also journaled obliquely to the axis of the work supporting means and also substantially tangentially to the circumference of said means, means for rotating the spindles, and adjusting means for adjusting the spindles and their grinding wheels in a radial direction to or from the work holder while maintaining the tangential relation.

7. In a machine of the character stated, a head, combined with a rotary sleeve centrally arranged upon the head, means to rotate the sleeve with a step by step adjustment, a work holding plunger rotatable with the sleeve and adjustable longitudinally thereon, means for adjusting the plunger longitudinally in the sleeve, a plurality of grinding wheels arranged about the work holding means, a plurality of spindles for the grinding wheels, supports for the spindles carried by the head and radially movable thereon, and hand controlled means for simultaneously adjusting the supports and their spindles and grinding wheels to or from the work holding means.

8. In a machine of the character stated, the combination of a head, with a work holder adjustable upon the head and having frictional means for holding the article to be cut, means for adjusting the work holder, a plurality of substantially radially adjustable supports upon the head, common means for adjusting all of the supports simultaneously toward or from each other, a plurality of grinding wheels and their spindles respectively carried upon the supports and with said grinding wheels adjustable tangentially with respect to the work support, and means for rotating the spindles.

9. In a machine of the character stated, the combination of a head, with a work holder adjustable upon the head and having frictional means for holding the article to be cut, means for adjusting the work holder, a plurality of substantially radially adjustable supports upon the head, common means for adjusting all of the supports simultaneously toward or from each other, a plurality of grinding wheels and their spindles respectively carried upon the supports and with said grinding wheels adjustable tangentially with respect to the work support, means for adjusting the spindles and their grinding wheels to different angles upon their supports to bring the opposite diameters of the grinding wheels into cutting relation with the work holder and the work thereon, and means for rotating the spindles.

In testimony of which invention, I hereunto set my hand.

JAMES STOTT.

Witnesses:
R. M. HUNTER,
FLORENCE DEACON.